United States Patent
Sartran et al.

(10) Patent No.: US 10,404,728 B2
(45) Date of Patent: Sep. 3, 2019

(54) LEARNING INTERNAL RANGES FROM NETWORK TRAFFIC DATA TO AUGMENT ANOMALY DETECTION SYSTEMS

(71) Applicant: Cisco Technology, Inc., San Jose, CA (US)

(72) Inventors: Laurent Sartran, Palaiseau (FR); Sébastien Gay, Les Rousses (FR); Pierre-André Savalle, Rueil-Malmaison (FR); Grégory Mermoud, Veyras (CH); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 15/263,487

(22) Filed: Sep. 13, 2016

(65) Prior Publication Data

US 2018/0077182 A1    Mar. 15, 2018

(51) Int. Cl.
*H04L 29/06*    (2006.01)
*H04L 12/24*    (2006.01)
*H04L 12/26*    (2006.01)

(52) U.S. Cl.
CPC .......... *H04L 63/1425* (2013.01); *H04L 41/16* (2013.01); *H04L 43/04* (2013.01); *H04L 43/12* (2013.01)

(58) Field of Classification Search
CPC ............. H04L 63/1458; H04L 63/1425; H04L 63/1408; H04L 43/04; H04L 43/12
See application file for complete search history.

(56) References Cited

U.S. PATENT DOCUMENTS

| | | | |
|---|---|---|---|
| 6,970,432 B1 | 11/2005 | Hankins et al. | |
| 7,929,534 B2 | 4/2011 | Poletto et al. | |
| 2003/0236652 A1 | 12/2003 | Scherrer et al. | |
| 2004/0220984 A1* | 11/2004 | Dudfield | H04L 41/0893 708/200 |
| 2012/0173710 A1* | 7/2012 | Rodriguez | H04L 43/026 709/224 |

OTHER PUBLICATIONS

Ben-Souayeh et al., Formal Checking of Multiple Firewalls, IJCSI Journal, vol. 9, Issue 3, No. 2, May 2012, pp. 1-9 (Year: 2012).*
Huang, et al. "In-Network PCA and Anomaly Detection", Advances in Neural Information Processing Systems (NIPS), Dec. 2006, pp. 1-8 (Year: 2006).*

(Continued)

*Primary Examiner* — Matthew Smithers
*Assistant Examiner* — Paul E Callahan
(74) *Attorney, Agent, or Firm* — Behmke Innovation Group LLC; James Behmke; Stephen D. LeBarron

(57) ABSTRACT

In one embodiment, a device in a network receives traffic records indicative of network traffic between different sets of host address pairs. The device identifies one or more address grouping constraints for the sets of host address pairs. The device determines address groups for the host addresses in the sets of host address pairs based on the one or more address grouping constraints. The device provides an indication of the address groups to an anomaly detector.

18 Claims, 10 Drawing Sheets

(56) References Cited

OTHER PUBLICATIONS

Cisco Inc. Product Data Sheet: "Cisco Traffic Anomaly Detector Module", Updated Jan. 6, 2014, Document ID:1457308827212731 (Year: 2014).*
Whisnant et al., "Network Profiling Using Flow", CERT® Program Technical Report CMU/SEI-2012-TR-006 ESC-TR-2012-006, http://www.sei.cmu.edu, Aug. 2012, 75 pages, Software Engineering Institute, Carnegie Mellon.
Rahman et al., "A Formal Approach for Network Security Management Based on Qualitative Risk Analysis", 978-3-901882-50-0, pp. 244-251, 2013 IFIP/IEEE International Symposium on Integrated Network Management (IM2013).
Rekhter et al., "Address Allocation for Private Internets", Request for Comments: 1918, Feb. 1996, 9 pages, Network Working Group.
Hinden et al., "Unique Local IPv6 Unicast Addresses", Request for Comments: 4193, Oct. 2005, 16 pages, Network Working Group.

* cited by examiner

US 10,404,728 B2

LEARNING INTERNAL RANGES FROM NETWORK TRAFFIC DATA TO AUGMENT ANOMALY DETECTION SYSTEMS

TECHNICAL FIELD

The present disclosure relates generally to computer networks, and, more particularly, to learning internal address ranges from network traffic data to augment anomaly detection systems.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, allows for the detection of an anomaly such as a horizontal movement (e.g. propagation of a malware, . . . ) or an attempt to perform information exfiltration, prompting the system to take remediation actions automatically.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
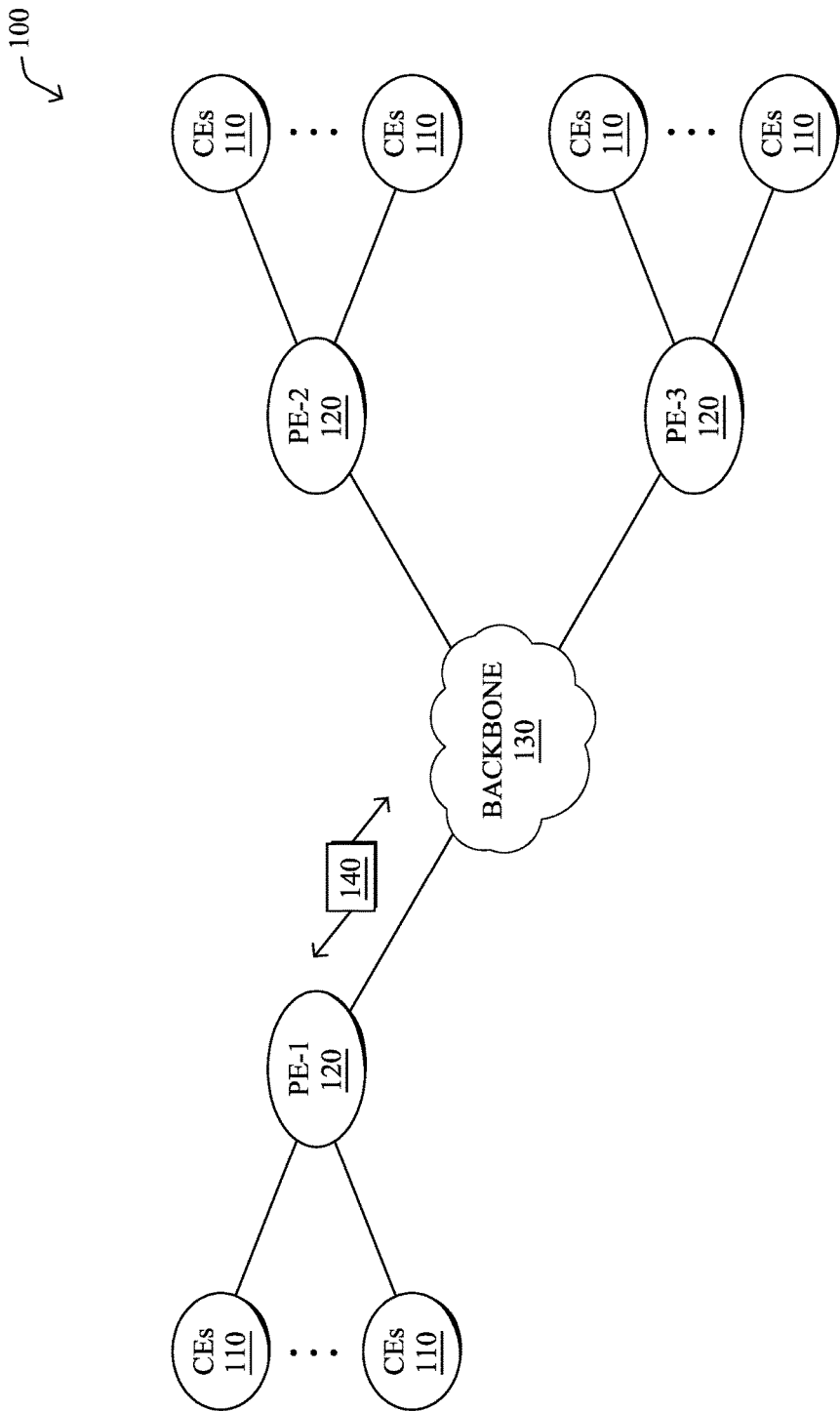
FIGS. 1A-1B illustrate an example communication network.

According to one or more embodiments of the disclosure, a device in a network receives traffic records indicative of network traffic between different sets of host address pairs. The device identifies one or more address grouping constraints for the sets of host address pairs. The device determines address groups for the host addresses in the sets of host address pairs based on the one or more address grouping constraints. The device provides an indication of the address groups to an anomaly detector.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
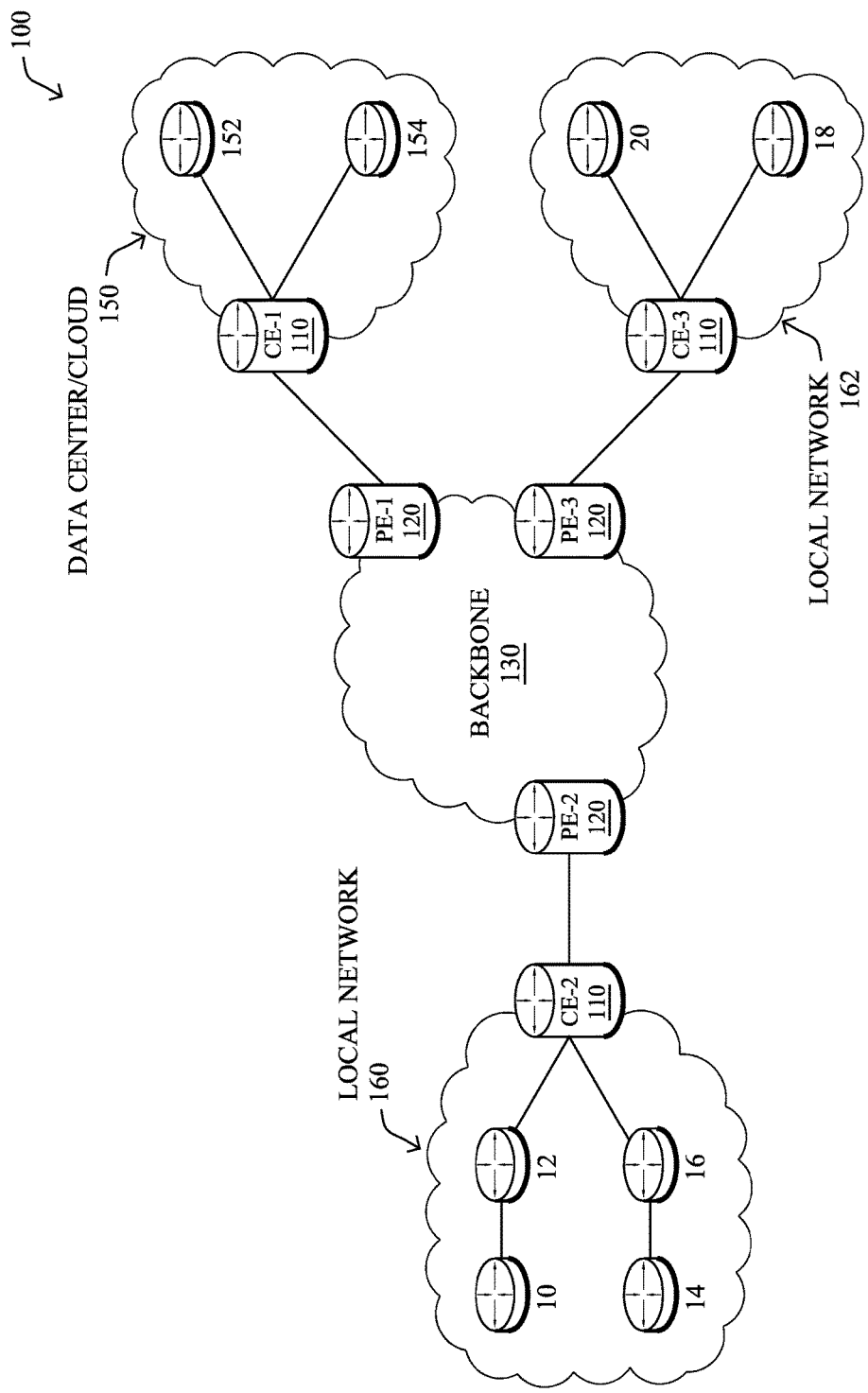

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
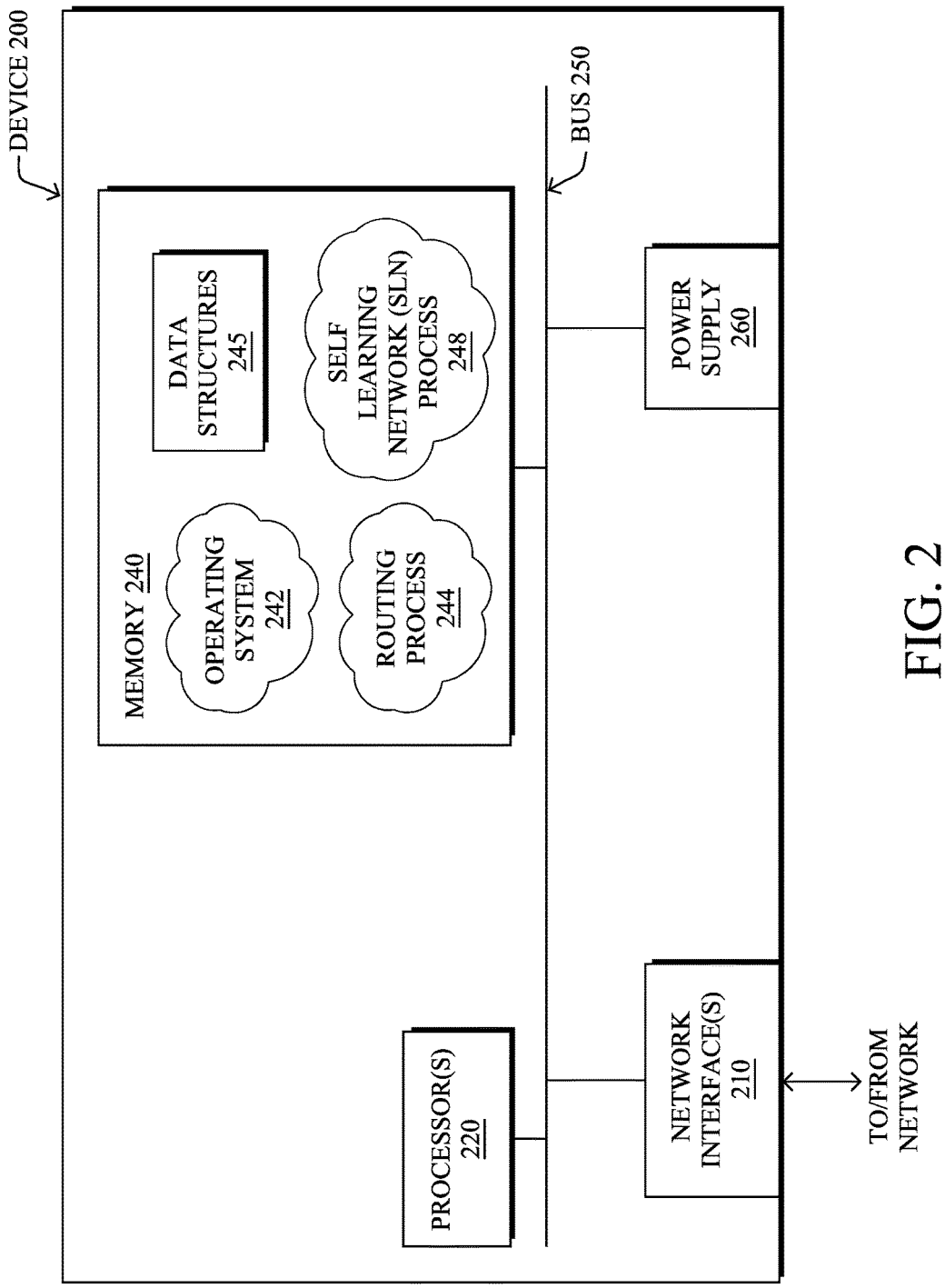
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures)

may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
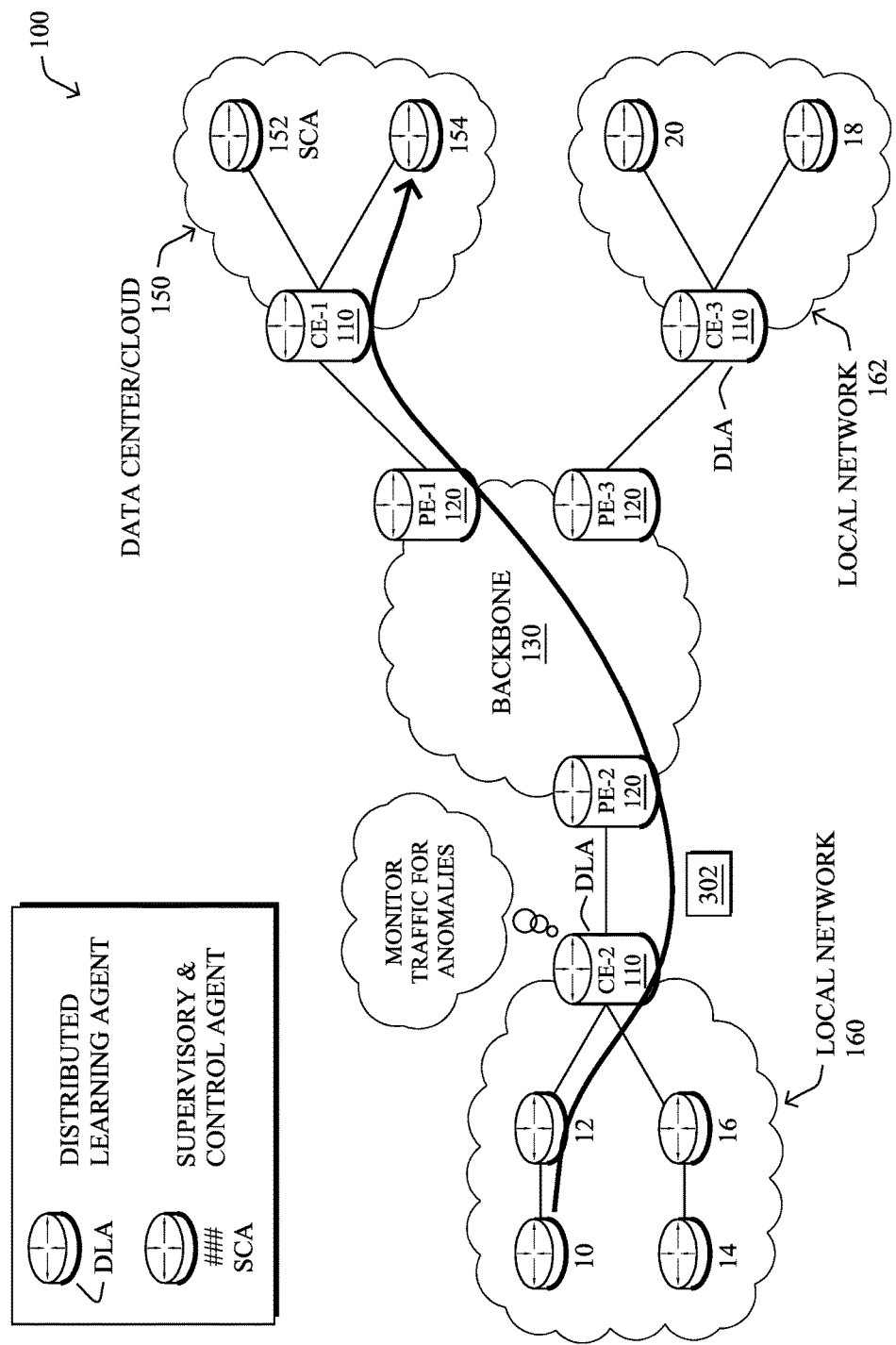
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
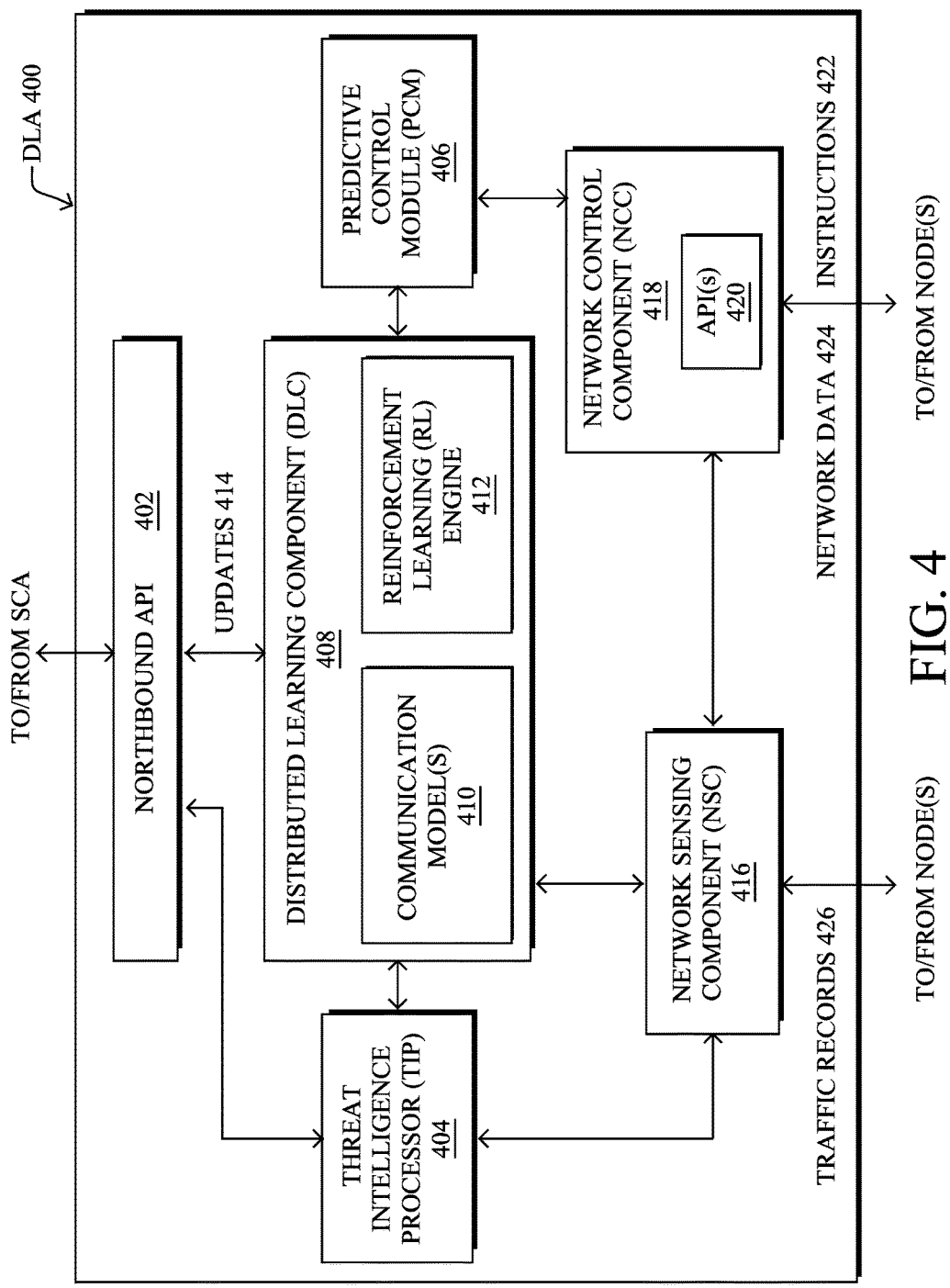
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, anomaly detection systems such as SLNs monitor the communications between hosts on a network and flag those that exhibit anomalous behaviors (e.g., statistical outliers). To that end, the system may collect traffic records 426 which may be the communications themselves, or representations thereof, and analyze the records using an anomaly detector (e.g., DLC 408). Thus, traffic records 426 may include information about the hosts participating in any given communication.

In some cases, identifying whether a party in a communication is an internal or external host (e.g., with respect to the branch or organization to which the host belongs) may help to calibrate the anomaly detector. In particular, such information allows the anomaly detector to determine whether all of the communications for a given host are observed. In addition, the anomaly detector may use the host information to cluster hosts for purposes of analysis. For example, the anomaly detector may aggregate the communications associated with a cluster of host devices, to determine whether or not the behavior of the cluster is anomalous.

Note that distinguishing between an "internal network" and an "external network" may be difficult from a networking point of view, in some situations. However, most network topologies follow classical patterns allowing for this distinction to be made. In general, a host may be considered part of an internal network when a user of the anomaly detection system can intervene on the host, either directly or indirectly (e.g., through escalation within the organization, etc.), when an anomaly is detected. In some cases, the user of the anomaly detection system may manually specify whether a given host is internal or external. However, doing so is both prone to errors and cumbersome to update.

Learning Internal Ranges from Network Traffic Data to Augment Anomaly Detection Systems The techniques herein allow an anomaly detection system, such as an SLN, to determine whether a given host is considered internal or external. In some aspects, the techniques leverage insights into the nature of observed traffic to determine ranges of network addresses that are internal or external. In some aspects, the techniques collect traffic records that indicate the source/destination address pairs of a network communication. In another aspect, the techniques use these records to solve an optimization problem (e.g., to find the lowest N-number of address groups/intervals that verify the constraints of the problem, the N-number of address groups that minimize the sum of the interval diameters, etc.). In a further aspect, the techniques herein provide the solution of the optimization problem to the anomaly detection system for use when detecting anomalies. These functions can be implemented in many different ways, such as on separate physical devices, as different processes, or as sub-processes of the same process, in various embodiments. Additionally, these functions can also be implemented directly as part of the anomaly detection system, in one embodiment.

Specifically, according to one or more embodiments of the disclosure as described in detail below, a device in a network receives traffic records indicative of network traffic between different sets of host address pairs. The device identifies one or more address grouping constraints for the sets of host address pairs. The device determines address groups for the host addresses in the sets of host address pairs based on the one or more address grouping constraints. The device provides an indication of the address groups to an anomaly detector.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 5:
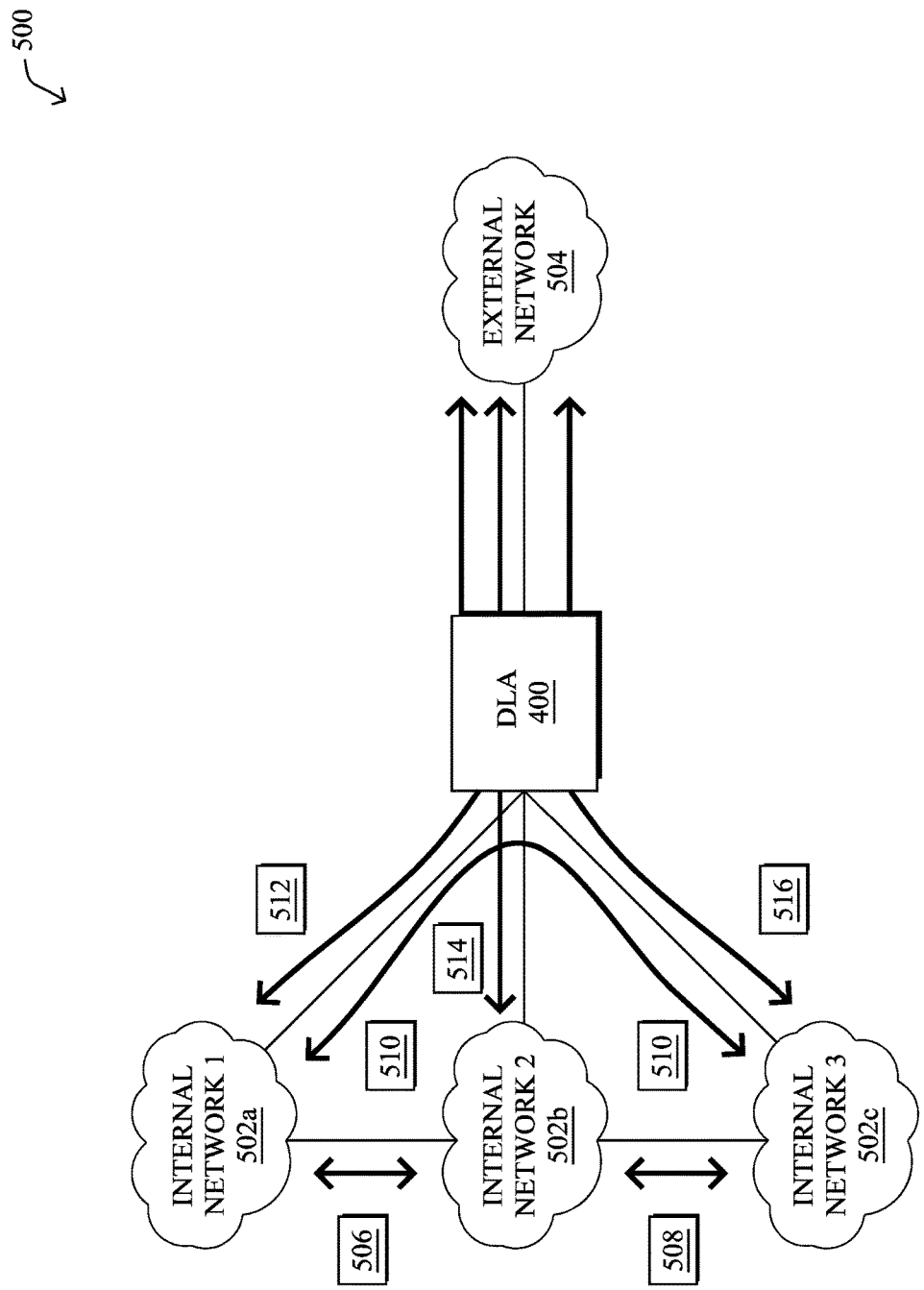
FIG. 5 illustrates an example of network traffic being conveyed.

Operationally, FIG. 5 illustrates an example 500 of traffic being conveyed in a network, according to some embodiments. As shown, assume that DLA 400 is a border router located on the edge of a network branch and connects the various hosts in the branch to other external networks such as the Internet, other branches of an entity's, etc. For purposes of illustration only, such external hosts are represented as belonging to an external network 504 that is outside of the local branch. Further, assume that the branch comprises three separate internal networks 502a-502c, each of which may have any number of host devices.

Various types of traffic may be present in the network configuration shown in FIG. 5. For example, some of the overall network traffic may include traffic 512 that is conveyed between hosts in internal network 502a and those in the external network 504, in one or both directions. Similarly, the hosts in internal networks 502b-502c may exchange traffic 514-516, respectively, with the hosts in external network 504.

Traffic in the example 500 shown can also be internal traffic between the hosts of internal networks 502a-502c, such as intra-branch traffic. In some cases, this traffic may still flow through DLA 400 (e.g., the branch router, etc.). For example, the hosts in internal networks 502a and 502c may exchange traffic 510 with one another via DLA 400. However, in other cases, traffic 506 between the hosts of internal networks 502a-502b and traffic 508 between the hosts of internal networks 502b-502c may not traverse DLA 400 (e.g., traffic 506-508 may be conveyed via other networking devices deeper in the branch, etc.).

While the example 500 in FIG. 5 illustrates one possible scenario, it is to be appreciated that DLA 400 may be any form of networking device (e.g., router, switch, etc.) connected to N-number of internal networks, denoted $I_1$ to $I_N$. Further, DLA 400 may be connected to the external world (e.g., external network 504) via a LAN or WAN interface.

Thus, in many cases, the following assumptions can be made about the anomaly detection system deployed in the network:

1. The anomaly detection system (e.g., DLA 400) does not observe traffic between two external hosts in external network 504.
2. The anomaly detection system does not observe traffic from an internal network to itself (e.g., from one host in internal network 502a to another host also in internal network 502a, etc.).
3. The internal networks $I_1$ to $I_N$ can be represented as groups/intervals of contiguous network addresses. Such intervals can be of any non-zero size.

By way of example, the following address groups/intervals may represent the internal networks 502a-502c shown in FIG. 5:

Internal network 502a: {10.2.3.0, . . . , 10.2.3.25},
Internal network 502b: {123.1.1.0, . . . , 123.1.1.255},
Internal network 502c: {145.56.78.90}.

In other words, internal network 502a may use a total of twenty six IP addresses, internal network 502b may use a total of 256 IP addresses, and network 502c may use only a single IP address. As used herein, the number of network addresses in a given address group/interval is referred to as the "diameter" of the corresponding network.

Also based on the above assumptions about the traffic observed by the anomaly detection system (e.g., DLA 400), whenever the anomaly detection system observes traffic sent from a host A to a host B, it means that either 1.) A or B is in external network 504 or 2.) that both A and B are in internal networks 502, but belong to different internal networks (e.g., host A belongs to internal network 502a and host B belongs to internal network 502c). As a consequence, each traffic record indicating that host A has communicated with a host B conveys information about the location of the hosts. However, additional analysis is required to pinpoint the locations of hosts A-B, as there are two possibilities for any given host address pair in terms of their locations.

Figure 6:
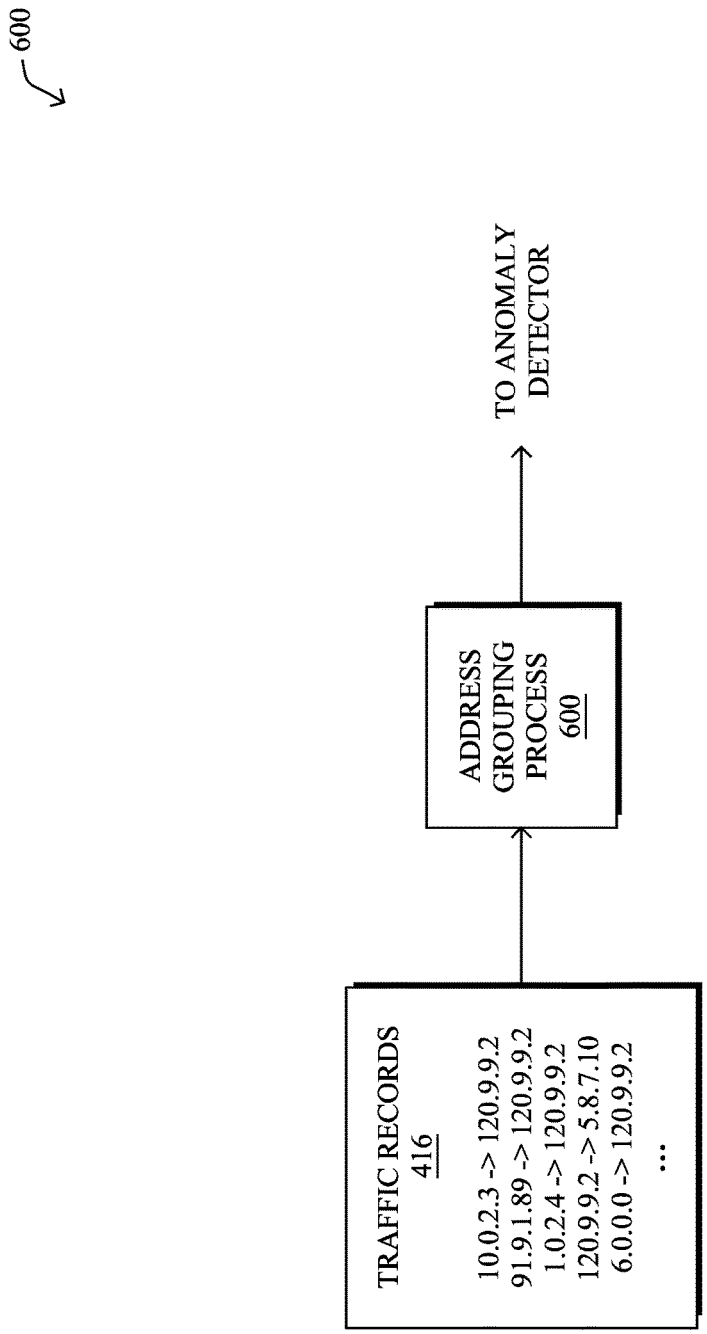
FIG. 6 illustrates an example address grouping process.

Referring now to FIG. 6, an example address grouping process 600 is shown, according to various embodiments. In general, address grouping process 600 may be configured to group network addresses based on host address pairs in traffic records 416. In some embodiments, address grouping process 600 may be executed by the DLA (e.g., as a sub-process 416 of DLA 400, etc.) or another device in communication therewith.

Traffic records 416 can be collected in any number of different ways such as via Netflow, IPFIX, via direct observation by the host device (e.g., a border router, etc.). As shown, traffic records 416, at minimum, may indicate the pairs of host addresses involved in a given communication (e.g., the source and destination addresses). When address grouping process 600 is implemented directly on a DLA 400, it may share the collection mechanism used by the anomaly detector. For example, NSC 416, an interface, etc. may collect traffic records 416 for processing by address grouping process 600. Otherwise, if address grouping process 600 is implemented on another device, it can connect to the network element to capture this information via Netflow, packet capture, or the like. Regardless of the capture mechanism used, the system may make traffic records 416 available to address grouping process 600, such as via a shared memory, remote procedure calls (RPCs), internal procedure calls (IPCs), or the like.

In some embodiments, address grouping process 600 may determine the address groups/intervals for the host addresses in traffic records 416 by solving a constrained optimization problem. Notably, the above expressions regarding the possible locations of a host participating in a conversation may serve as the constraints for such a problem. In turn, address grouping process 600 may attempt to find the smallest number of internal address ranges that verify the constraints. Further, address grouping process 600 may do so at any time, such as when traffic data 416 is updated, after expiration of a timer, in response to an explicit request to do so, etc.

In general, the constrained problem to be solved by address grouping process 600 may be formulated as follows:

For N from 1 to $N_{max}$, find the N-number of internal address range intervals $I_1$ to $I_N$ such that all source/destination address pairs (A, B) in traffic data 416 satisfy one of the following:

A belongs to E and B belongs to $I_n$, for some n in $\{1 \ldots N\}$, where E is the group of external addresses.

B belongs to E and A belongs to $I_n$, for some n in $\{1 \ldots N\}$, where E is the set of external ranges.

A belongs to $I_n$ and B belongs to $I_m$, for some n in $\{1 \ldots N\}$ and m in $\{1 \ldots N\}$, with n being different from m.

When formulated in such a way, it is clear that a solution exists with P distinct address groups/intervals, where P is the number of unique addresses in traffic records 416. Said differently, one solution would be to place each address in its own address group with an internal diameter of 1. However, this is the trivial solution. What is of greater interest is the solution that optimally distributes the host addresses to the groups while satisfying the above.

Given N, address grouping process 600 may compute the address groups in a number of different ways. In some embodiments, address grouping process 600 may use a satisfiability modulo theories (SMT) solver using linear arithmetic, to determine the optimal address groups. In general, SMT solvers work to solve a set of input logic expressed as a set of inequalities. Example SMT solvers include Absolver, CVC3/CVC4, veriT, although any SMT solver may be used.

To formulate the optimization problem for an SMT solver, the constraints can be rewritten in inequality form:

A belongs to $I_n$, which is an [inf $I_n$, sup $I_n$] interval, iff inf $I_n \leq A \leq$ sup $I_n$ A belongs to E iff A does not belong to any $I_n$. In other words, A belongs to E if, for any n such that $1 \leq n \leq N$, $A >$ sup $I_n$ or $A <$ inf $I_n$ For unicity purposes, it is assumed that for n<m, sup $I_n <$ inf $I_n$. The objective function is then the sum over n of sup $I_n$-inf $I_n$.

Address grouping process 600 can terminate the processing in several ways:

1. Address grouping process 600 can succeed in finding $N < N_{max}$ ranges that verify the constraints, in which case the intervals are made available to the anomaly detection mechanism.
2. Address grouping process 600 can fail to find fewer than N ranges that verify the constraints, in which case a failure flag is exposed (e.g., to a user interface, to the anomaly detection system, etc.).
3. The computation of the solution by address grouping process 600 exceeds the resources allocated (e.g., in terms of CPU, memory, etc.), in which case a failure flag is exposed (e.g., to a user interface, to the anomaly detection system, etc.).

In an alternative formulation, the problem can be left unsolved for a proportion of the hosts, to be handled by the anomaly detector as it sees fit.

A further variation of the techniques herein assumes that the host devices that belong to the same subrange also belong to the same range. Thus, instead of address grouping process 600 simply assessing the (source address, destination address) pair, it may instead operate on the (source subrange, destination address) pair. In the case of an IPv4 address, a suitable subrange can be a /30, or /28. This greatly reduces the number of constraints for address grouping process 600, speeding up the computation.

Typically, address grouping process 600 may be executed at the edge of a network (e.g., of a branch office, etc.). Hence, Address grouping process 600 may label all IP addresses external to the branch as "external," whether they belong to the enterprise network or not.

Figure 7A:
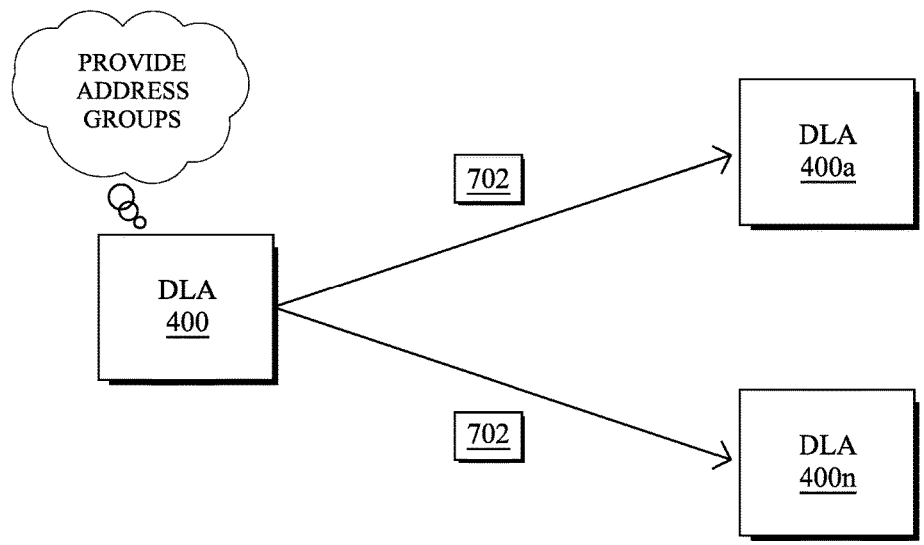
FIGS. 7A-7C illustrate examples of the determination of address groups.
Figure 7B:
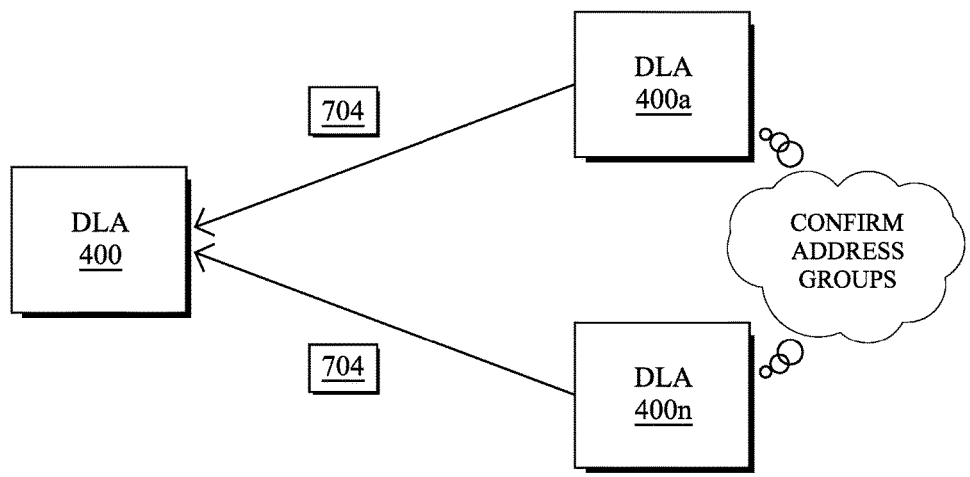
Figure 7C:
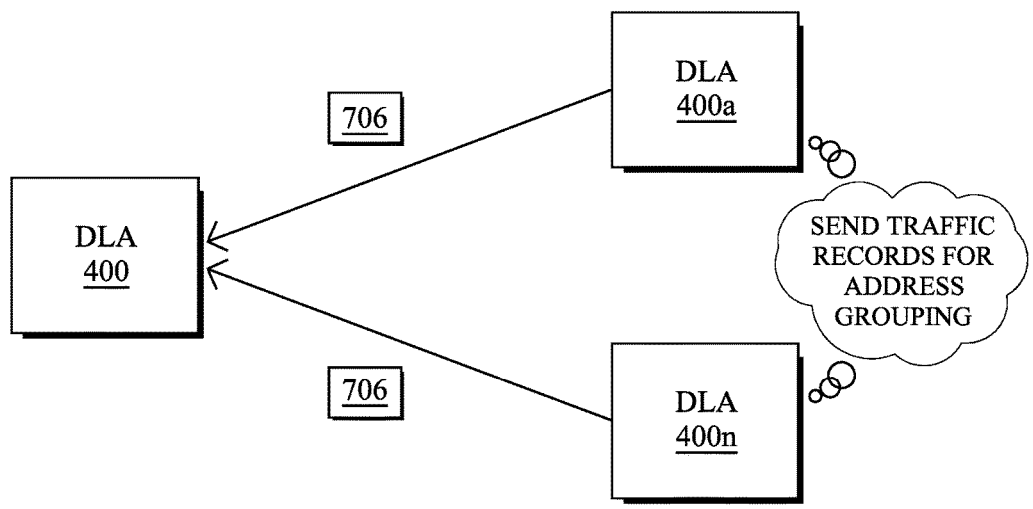

As shown in FIGS. 7A-7C other implementations provide for different networking devices in the enterprise network to collaborate, to determine the host address groups. In some embodiments, the devices may communicate with one another, to refine their own classifications. By broadcasting to one another the groups/ranges that they classified as internal, the different devices can work to refine the classifications. For example, as shown in FIG. 4A, DLA 400 may send its own sets of address groups 702 to any number of DLAs 400a-400n (e.g., a first through nth DLA).

In turn, when a device receives the address groups from another, it may perform any or all of the following:

Confirm the classification they inferred and solve any "unknown" cases. Notably, if a range is unknown in a branch and internal in another, it becomes external in the first one.

Discriminate between corporate and non-corporate ranges. A range that is external for all devices is non-corporate. This assumes however that all the branches of the corporate network implement the techniques herein.

Additionally, a given device may also specify whether it knows with a high probability that a given host address is external. For example, if one of DLAs 400a-400n runs an exterior gateway protocol (EGP) such as the Border Gateway Protocol (BGP), it may be able to determine that a given host address is external by comparing the address with its own autonomous system (AS).

As shown in FIG. 7B, the confirming devices may then share their results 704 with the originator and/or with one another, thereby leveraging the knowledge of the different devices in the enterprise network to group the host addresses.

Finally, a more complex variant solves the problem jointly for all network devices, in some embodiments. For example, as shown in FIG. 7C, the various DLAs 400a-400n may instead send their traffic records via messages 706 for address grouping to a central device that executes address grouping process 600, such as SCA 700 or another centralized device. In another embodiment, address grouping process 600 is distributed amongst all of DLAs 400a-400n.

If the address groupings are computed jointly, the constraints for address grouping process 600 may be modified such that the group of external addresses E now represents only the non-enterprise ranges. In particular, the optimization problem may be rewritten as follows:

For all network devices $R_1$ to $R_K$, and for N from 1 to $N_{max}$, find the K times N ranges $I_1^1$ to $I_N^K$ such that for all host address pairs (A,B), either:
- A belongs to E and B belongs to $I_n^K$, for some n in {1 . . . N} and k in {1 . . . K}
- B belongs to E and A belongs to $I_n^K$, for some n in {1 . . . N} and k in {1 . . . K}
- A belongs to $I_n^K$ and B belongs to $I_m^K$, for some k in {1 . . . K}, n in {1 . . . N}, and m in and m in {1 . . . N}, where n is different than m
- A belongs to $I_n^K$ and B belongs to $I_{m'}^j$, for some k in {1 . . . K}, j in {1 . . . K}, n in {1 . . . N} and m in {1 . . . N}, with j different from k and n not necessarily different from m.

Regardless of how address grouping process 600 determines the address groups, a further aspect of the techniques herein provides for process 600 to send the results to the anomaly detection system, as shown in FIG. 6. Address grouping process 600 may do so using any number of different mechanisms such as shared memory, RPCs, IPCs, function calls within the same process, or the like. In turn, the anomaly detection system may use the distinctions between internal and external host addresses for purposes of anomaly detection. For example, if a set of hosts are located in the same internal address group, the anomaly detection system may treat the host devices as a cluster and assess their behaviors as a group.

Preliminary testing has shown the techniques herein to be highly accurate. Indeed, the core assumption that is made is both reasonable and verified (i.e., that whenever two hosts are seen exchanging traffic by the system these hosts either belong to different internal groups, or one of them is external).

A first experiment using the techniques herein was conducted using synthetic data. This synthetic data was formed by first defining a set of internal groups, then by sampling hosts from these internal group, or from the external group, and by sampling pairs of hosts that could potentially communicate with one another. On this data, the techniques were able to accurately recover the internal groups that were defined in the input data set. However, while this experiment gave a positive result, this experiment only tests the correct transcription of the problem as constraints and the correct functioning of the SMT solver.

A second experiment was also performed to test the techniques herein on actual network traffic. In particular, traffic records were gathered from a branch office of an enterprise network over the span of fifty days. From this, approximately, 24,000 unique pairs of IPv4 addresses were observed during the collection time period. To verify the results of the techniques, the operator of the network also supplied a list of three IPv4 ranges belonging to the branch. As the actual list of addresses is considered sensitive, the addresses are partially redacted herein by using letters to represent an undisclosed number between 0 and 255: 10.A.B.0/24 (group 1), 10.A.C.0/24 (group 2), and 10.D.E.192/26 (group 3).

From the experiment, the following address groups/ranges were obtained: 10.D.E.192/26, 10.A.B.0/25, 10.A.B.128/25, 10.A.C.0/24, F.G.106.0/26, F.H.128.128/26, and I.64.0.0/21. Of first note is that the system was able to correctly identify the three address groups supplied by the operator of the network, with only the second group split into two /25 ranges. This split is likely attributable to a first host in the first /25 exchanging traffic with another host in the second /25.

Interestingly, the techniques also found three ranges (F.G.106.0/26, F.H.128.128/26, I.64.0.0/21) that belong to the public, routable IPv4 address space. WHOIS queries revealed them to belong to the same operator of the network which were probably headquarters ranges, internal to the organization, but external to the branch, and which can be considered as such by the system.

These experiments show that the techniques herein can yield reasonable internal ranges lists, which could also be fine-tuned via user input (e.g., by tagging, or merging, or adjusting ranges), if need be. This is much more efficient than having the user manually supply the entire list outright, which may be prone to errors and cumbersome to update.

Figure 8:
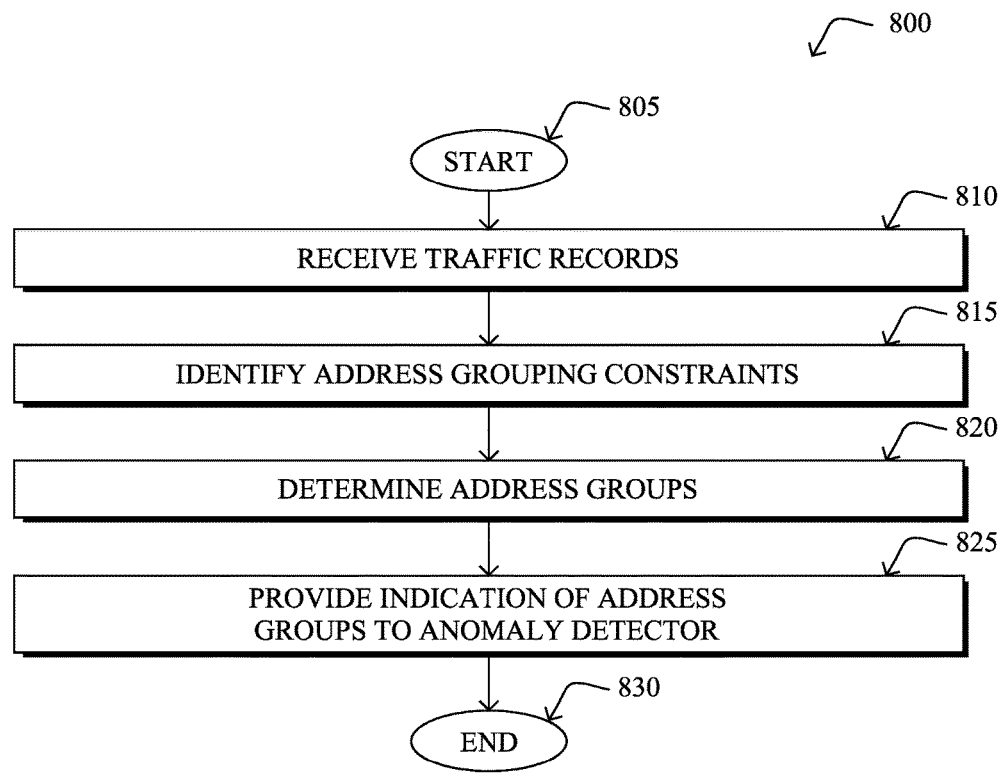
FIG. 8 illustrates an example simplified procedure for providing address groups to an anomaly detector.

FIG. 8 illustrates an example simplified procedure for providing address groups to an anomaly detector in a network in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device may receive traffic records regarding traffic in the network. Generally, such traffic records may indicate the host address pairs (e.g., source and destination) of traffic observed in the network either by the device itself or another device in communication therewith.

At step 815, as detailed above, the device may identify one or more address grouping constraints for the sets of host address pairs. For example, a constraint may be that any given communication is between an internal and external network, between an external address and an internal network, or between two internal networks. In some embodiments, these constraints may be codified as inequalities as part of a constrained optimization problem.

At step 820, the device may determine address groups for the host addresses in the traffic based on the one or more address grouping constraints, as described in greater detail above. In some embodiments, the device may use a satisfiability modulo theories (SMT) solver on the addresses, in view of the constraint(s), to determine the address groups. Such address groups may include, for example, a group of addresses that are deemed external to the network and one or more groups of addresses that are deemed internal to the network. For example, there may be multiple internal groups of addresses at a given branch.

At step 825, as detailed above, the device may provide an indication of the determined address groups to an anomaly detector. In turn, the anomaly detector may use this information to better assess the behaviors of the host devices. For example, the anomaly detector may form a cluster of hosts that belong to the same address group, under the assumption that the hosts are expected to exhibit similar behavior. The anomaly detector may also use the address groupings in other ways for purposes of anomaly detection, as well. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the grouping of host addresses and to distinguish hosts that are "internal" from those that are "external" to the network. Such information may be leveraged by an anomaly detection system in the network, such as an SLN.

While there have been shown and described illustrative embodiments that provide for the learning of internal vs. external host address ranges/groups, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, traffic records indicative of network traffic between different sets of host address pairs;
identifying, by the device, one or more address grouping constraints for the sets of host address pairs;
determining, by the device, address groups for the host addresses in the sets of host address pairs based on the one or more address grouping constraints;
providing, by the device, an indication of the address groups to an anomaly detector;
providing, by the device, the address groups to one or more other devices in the network; and
receiving, by the device, confirmation of the address groups from the one or more other devices in the network.

2. The method as in claim 1, wherein a particular one of the one or more address groups comprises host addresses associated with an external network that is external to the network.

3. The method as in claim 2, wherein a second one of the address groups comprises host addresses associated with an internal network that is internal to the network.

4. The method as in claim 1, wherein determining the address groups for the host addresses in the sets of host pairs comprises:
using, by the device, a satisfiability modulo theories (SMT) solver on the identified one or more address grouping constraints for the sets of host address pairs.

5. The method as in claim 4, wherein the one or more address grouping constraints indicates that a particular host address pair must be associated with one of: traffic sent from an internal network to an external network, traffic sent from an external network to an internal network, or traffic between two internal networks.

6. The method as in claim 1, wherein the device is a supervisory device and the traffic records are received from a plurality of distributed learning agents configured to execute anomaly detectors.

7. The method as in claim 1, further comprising:
receiving, at the device, address groups from a second device in the network;
comparing, by the device, the determined address groups to the received address groups; and
providing, by the device, a result of the comparison to the second device in the network.

8. The method as in claim 1, wherein the device is a border router and hosts the anomaly detector.

9. The method as in claim 1, wherein the anomaly detector uses the address groups to analyze traffic for host clusters that are based on the address groups.

10. An apparatus, comprising:
one or more network interfaces to communicate with a network;
a processor coupled to the network interfaces and configured to execute one or more processes; and
a memory configured to store a process executable by the processor, the process when executed operable to:
receive traffic records indicative of network traffic between different sets of host address pairs;
identify one or more address grouping constraints for the sets of host address pairs;
determine address groups for the host addresses in the sets of host address pairs based on the one or more address grouping constraints;
provide an indication of the address groups to an anomaly detector;
provide the address groups to one or more other devices in the network; and
receive confirmation of the address groups from the one or more other devices in the network.

11. The apparatus as in claim 10, wherein a particular one of the one or more address groups comprises host addresses associated with an external network that is external to the network, and wherein a second one of the address groups comprises host addresses associated with an internal network that is internal to the network.

12. The apparatus as in claim 10, wherein the apparatus determines the address groups for the host addresses in the sets of host pairs by using a satisfiability modulo theories (SMT) solver on the identified one or more address grouping constraints for the sets of host address pairs.

13. The apparatus as in claim 12, wherein the one or more address grouping constraints indicates that a particular host address pair must be associated with one of: traffic sent from an internal network to an external network, traffic sent from an external network to an internal network, or traffic between two internal networks.

14. The apparatus as in claim 10, wherein the apparatus is a supervisory device and the traffic records are received from a plurality of distributed learning agents configured to execute anomaly detectors.

15. The apparatus as in claim 10, wherein the process when executed is further operable to:
  receive address groups from another device in the network;
  compare the determined address groups to the received address groups; and
  provide a result of the comparison to the other device in the network.

16. The apparatus as in claim 10, wherein the apparatus is a border router and hosts the anomaly detector.

17. The apparatus as in claim 10, wherein the anomaly detector uses the address groups to analyze traffic for host clusters that are based on the address groups.

18. A tangible, non-transitory, computer-readable medium storing program instructions that cause a device in a network to execute a process comprising:
  receiving, at the device, traffic records indicative of network traffic between different sets of host address pairs;
  identifying, by the device, one or more address grouping constraints for the sets of host address pairs;
  determining, by the device, address groups for the host addresses in the sets of host address pairs based on the one or more address grouping constraints;
  providing, by the device, an indication of the address groups to an anomaly detector;
  providing, by the device, the address groups to one or more other devices in the network; and
  receiving, by the device, confirmation of the address groups from the one or more other devices in the network.

* * * * *

UNITED STATES PATENT AND TRADEMARK OFFICE
CERTIFICATE OF CORRECTION

PATENT NO. : 10,404,728 B2
APPLICATION NO. : 15/263487
DATED : September 3, 2019
INVENTOR(S) : Laurent Sartran et al.

Page 1 of 1

It is certified that error appears in the above-identified patent and that said Letters Patent is hereby corrected as shown below:

In the Specification

Column 16, Line 7, please amend as shown:
$N \leq N_{max}$ ranges that verify the constraints, in which Signed and Sealed this
Third Day of March, 2020

Andrei Iancu
*Director of the United States Patent and Trademark Office*